(12) United States Patent
Budil

(10) Patent No.: US 11,820,674 B2
(45) Date of Patent: Nov. 21, 2023

(54) SOLAR-POWERED CONTINUOUS DISTILLATION ASSEMBLY HAVING EFFICIENT HEAT RECOVERY

(71) Applicant: WaterTransformer GmbH, Vienna (AT)

(72) Inventor: Matthias Budil, Vienna (AT)

(73) Assignee: WaterTransformer GmbH, Vienna (AT)

( * ) Notice: Subject to any disclaimer, the term of this patent is extended or adjusted under 35 U.S.C. 154(b) by 0 days.

(21) Appl. No.: 17/268,824

(22) PCT Filed: Aug. 14, 2019

(86) PCT No.: PCT/AT2019/060258
§ 371 (c)(1),
(2) Date: Feb. 16, 2021

(87) PCT Pub. No.: WO2020/033984
PCT Pub. Date: Feb. 20, 2020

(65) Prior Publication Data
US 2021/0206658 A1     Jul. 8, 2021

(30) Foreign Application Priority Data

Aug. 17, 2018   (AT) .............................. A 60125/2018

(51) Int. Cl.
*B01D 1/28*     (2006.01)
*C02F 1/14*     (2023.01)
(Continued)

(52) U.S. Cl.
CPC .............. *C02F 1/14* (2013.01); *B01D 1/0035* (2013.01); *B01D 1/2881* (2013.01);
(Continued)

(58) Field of Classification Search
CPC ....... C02F 1/14; B01D 1/0035; B01D 1/2881; B01D 1/2887; B01D 1/2896; B01D 3/02; B01D 5/006
See application file for complete search history.

(56) References Cited

U.S. PATENT DOCUMENTS 3,232,846  A  *  2/1966  Kimmerle ................ C02F 1/14
                                                        202/205
4,118,283  A  *  10/1978  Diggs ..................... F24S 10/60
                                                        202/205
(Continued)

FOREIGN PATENT DOCUMENTS

CH        712868  A2      3/2018
DE       1006750  B       4/1957
(Continued)

OTHER PUBLICATIONS

WIPO, International Search Report (on priority application), dated Feb. 4, 2020.

*Primary Examiner* — Jonathan Miller
(74) *Attorney, Agent, or Firm* — Laurence P. Colton; SMITH TEMPEL BLAHA LLC

(57) ABSTRACT

A distillation assembly which, with the aid of solar energy, continuously evaporates a feed liquor. The distillation assembly includes a container which contains the feed liquor, a container in which the distillate is collected, these containers being in thermal contact, and a compressor. The compressor compresses the vapor which is produced by boiling the feed liquor using the concentration of solar energy and/or using negative pressure, into the distillate container such that the vapor condenses there, and the evaporation enthalpy and thermal energy is returned to the feed liquor by the thermal contact.

18 Claims, 10 Drawing Sheets

(51) Int. Cl.
*B01D 1/00* (2006.01)
*B01D 3/02* (2006.01)
*B01D 5/00* (2006.01)

(52) U.S. Cl.
CPC ......... *B01D 1/2887* (2013.01); *B01D 1/2896* (2013.01); *B01D 3/02* (2013.01); *B01D 5/006* (2013.01)

(56) References Cited

U.S. PATENT DOCUMENTS

| | | | | |
|---|---|---|---|---|
| 4,343,683 A * | 8/1982 | Diggs | ............. | F24S 10/13 202/180 |
| 4,863,567 A * | 9/1989 | Raley | ............. | B01D 1/0017 202/205 |
| 5,505,917 A * | 4/1996 | Collier, Jr. | ............. | C02F 1/02 126/684 |
| 5,645,693 A * | 7/1997 | Gode | ............. | B01D 1/26 203/DIG. 1 |
| 5,772,850 A * | 6/1998 | Morris | ............. | B01D 1/12 159/24.2 |
| 5,968,321 A * | 10/1999 | Sears | ............. | B01D 3/42 203/1 |
| 6,010,599 A * | 1/2000 | Wang | ............. | B01D 3/007 202/205 |
| 6,932,889 B1 * | 8/2005 | Holcomb | ............. | B01D 3/10 202/205 |
| 7,431,805 B2 * | 10/2008 | Beckman | ............. | B01D 3/10 202/160 |
| 7,897,019 B2 * | 3/2011 | Akers | ............. | B01D 1/14 261/153 |
| 8,419,904 B2 * | 4/2013 | Ba-abbad | ............. | B01D 5/0075 203/DIG. 1 |
| 8,951,391 B2 * | 2/2015 | McClure | ............. | B01D 1/06 159/DIG. 42 |
| 9,428,403 B2 * | 8/2016 | Haynes | ............. | B01D 1/0094 |
| 9,771,278 B2 * | 9/2017 | Haynes | ............. | B01D 1/0035 |
| 2007/0007120 A1 * | 1/2007 | Taylor | ............. | C02F 1/04 203/1 |
| 2008/0083605 A1 * | 4/2008 | Holtzapple | ............. | C02F 1/66 239/398 |
| 2011/0203915 A1 * | 8/2011 | McClure | ............. | B01D 1/0082 203/3 |
| 2013/0168224 A1 * | 7/2013 | Godshall | ............. | C02F 1/14 202/172 |
| 2016/0368784 A1 * | 12/2016 | Haynes | ............. | B01D 1/305 |
| 2017/0158525 A1 | 6/2017 | Calene | | |
| 2017/0197844 A1 * | 7/2017 | Kamen | ............. | B01D 1/2896 |

FOREIGN PATENT DOCUMENTS

| | | |
|---|---|---|
| DE | 19522239 A1 | 1/1997 |
| DE | 202006000195 U1 | 2/2007 |
| EP | 2229988 A1 | 9/2010 |
| EP | 2952824 A1 | 12/2015 |
| WO | 2017190187 A1 | 11/2017 |

* cited by examiner

SOLAR-POWERED CONTINUOUS DISTILLATION ASSEMBLY HAVING EFFICIENT HEAT RECOVERY

CROSS REFERENCE TO RELATED APPLICATIONS

This application is the US National Phase of and claims the benefit of and priority on International Application No. PCT/AT2019/060258 having a filing date of 14 Aug. 2019, which claims priority on and the benefit of Austrian Patent Application No. A60125/2018 having a filing date of 17 Aug. 2018.

BACKGROUND OF THE INVENTION

Technical Field

The invention relates to a distillation assembly which, with the aid of solar energy, continuously evaporates a feed liquor.

Prior Art

Distillation is an effective method of removing substances dissolved in liquids or reducing their concentration. A key application is the extraction of fresh water from salt water and the production of bioethanol. For distillation to take place, the liquid has to be evaporated and the resulting vapor re-condensed. The evaporation of liquids is a very energy-intensive process. As such, effective and inexpensive energy sources and heat recovery are essential in distillation applications. Distillation plants that use solar energy for the evaporation process are well known. Distillation plants that use heat pumps for heat recovery are also well known. In the field of mechanical vapor recompression, the vapor (fumes) is/are compressed, raising the condensation temperature so that this vapor condenses on a surface that is in thermal contact with the feed liquor and thus the enthalpy of vaporization contained therein is returned to the feed liquor. It is necessary to take into account that a liquid in which substances are dissolved has a higher boiling temperature than the pure liquid. Seawater boils at a temperature that is about 1° C. higher than that for fresh water.

It is essential that the container of the liquid to be distilled and the container containing the compressed vapor have a good thermal contact and that thermally, the whole assembly is well insulated from the environment. For thermal insulation, double-walled vacuum-insulated borosilicate glass tubes have been tried and tested millions of times over and can be produced cheaply. They are used as solar collectors for the production of hot water and withstand particularly harsh environmental conditions, e.g. hailstorms.

Solar energy is, in itself, free of charge, however it consumes land because its power density is low. In addition, plants have to be built that can utilize the solar energy. Both of these cost money. The invention is based on the task of producing as much distillate as possible in relation to the available power and the plant that has been invested in.

BRIEF SUMMARY OF THE INVENTION

The invention solves this problem in that a container containing the feed liquor and a container in which the distillate collects are part of a distillation assembly, wherein these containers are in thermal contact and a compressor compresses the vapor, which is produced as a result of boiling the feed liquor by concentrating solar energy and/or by negative pressure, into the distillate container so that this vapor condenses there and the vaporization enthalpy and thermal energy are returned to the feed liquor via the thermal contact, wherein these containers have a circular cross-section or a cross-section deviating thereof, e.g. an oval, elliptical, triangular or polygonal cross-section, and their surface is optionally corrugated and/or bears ribs in order to improve the heat transfer and to increase the evaporation and condensation surface, and in that there is a feed line and a discharge line for the feed liquor and a discharge line for the distillate, the feed and discharge being controlled by valves and/or pumps, and there is optionally a vacuum pump which generates a negative pressure in the container which contains the feed liquor, and/or the distillation assembly is operated at high altitudes in order to lower the boiling temperature of the feed liquor.

BRIEF DESCRIPTION OF THE DRAWINGS

The invention is explained below by means of drawings.

DETAILED DESCRIPTION OF PREFERRED EMBODIMENTS

Figure 1:
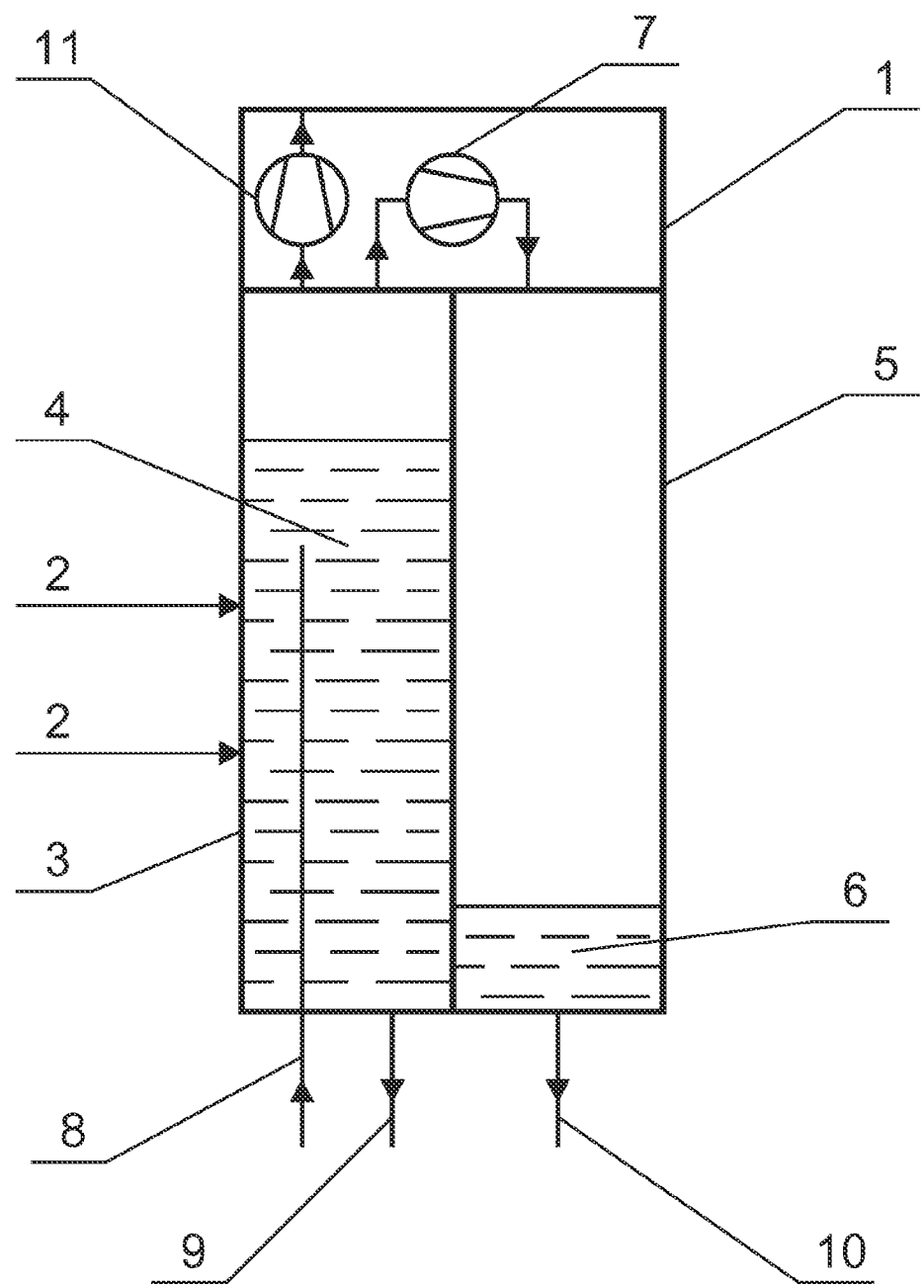
FIG. 1: A distillation assembly 1 which is irradiated by sunlight 2, in which there is a container 3 containing the feed liquor 4 which, at this point, is in thermal contact with a container 5 in which the distillate 6 collects, wherein a compressor 7 compresses the vapor produced by boiling the feed liquor 4 into the distillate container 5 and in which there is a feed line 8 and a discharge line 9 for the feed liquor and a discharge line for the distillate 10, wherein optionally, there is a vacuum pump 11 which generates negative pressure in the container 3 containing the feed liquor 4.
Figure 2:
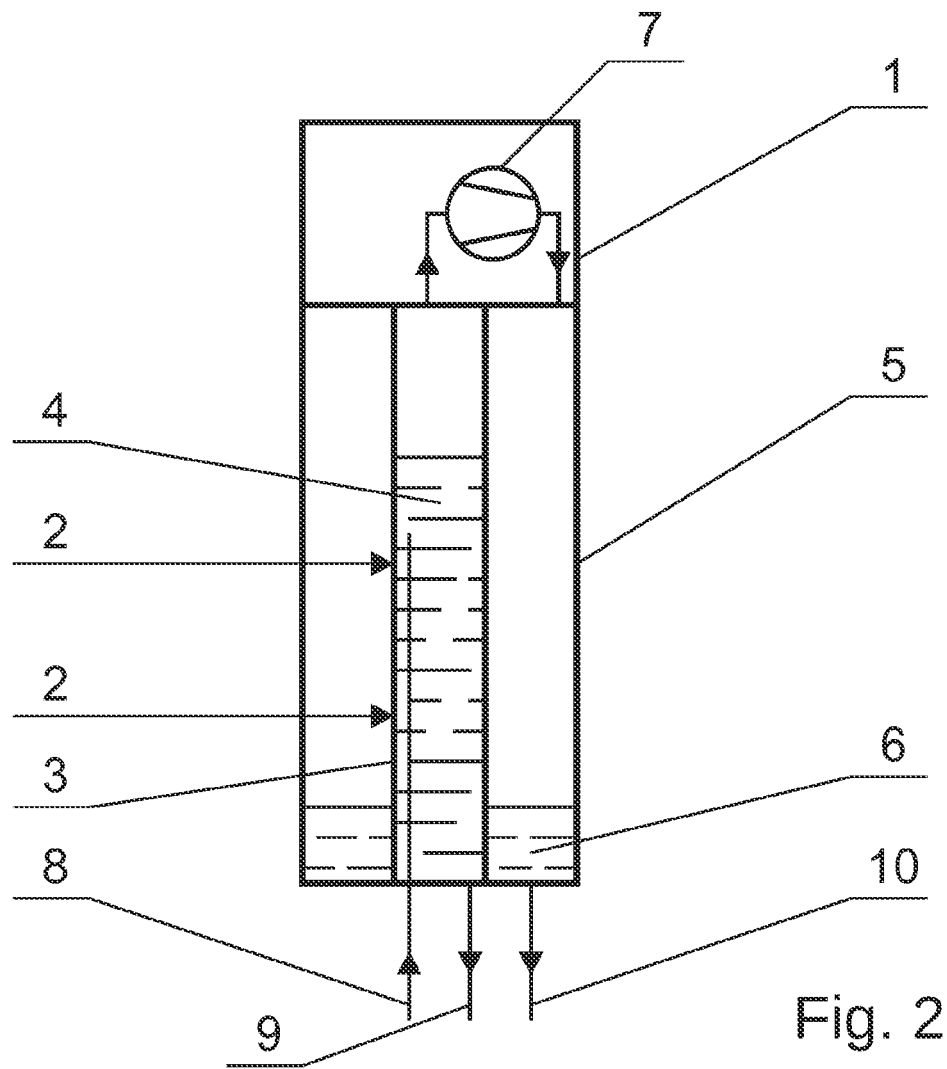
FIG. 2: Variant A of the distillation assembly 1 in which a container 3 containing the feed liquor 4 is located in a container 5 containing the distillate 6 and the vapor which is produced by the evaporation of the feed liquor 4 with the aid of the energy sunlight 2 and is compressed by a compressor 7, and in which there is a feed line 8 and a discharge line 9 for the feed liquor 4 and a discharge line 10 for the distillate 6.
Figure 3:
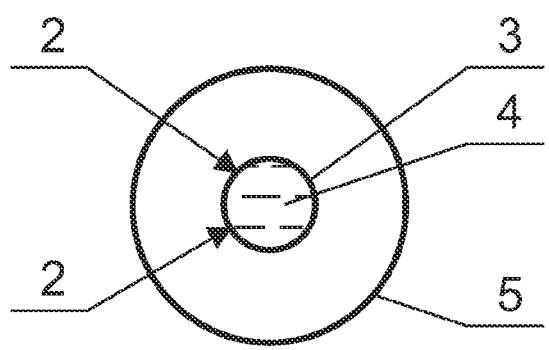
FIG. 3: Cross-section of variant A through the feed liquor 4, which is in a container 3 irradiated by sunlight 2 and the container 5 for the distillate.

In variant A of the invention (FIGS. 2 and 3), the container 3 containing the feed liquor 4 is located in a container 5 containing the distillate 6 and the vapor, wherein the containers 3, 5 are in thermal contact, wherein the vapor is formed by the evaporation of the feed liquor 4 with the aid of the energy of sunlight 2 and compressed by a compressor 7 so that it condenses on the walls of the distillate container 5 and releases the inherent thermal enthalpy of vaporization and thermal energy to the feed liquor container 3 in order to return the heat to the feed liquor 4. In this case, the light from the sun 2 penetrates the outer container 5 that contains the compressed vapor, the walls of which are designed to be transparent to solar radiation.

Figure 4:
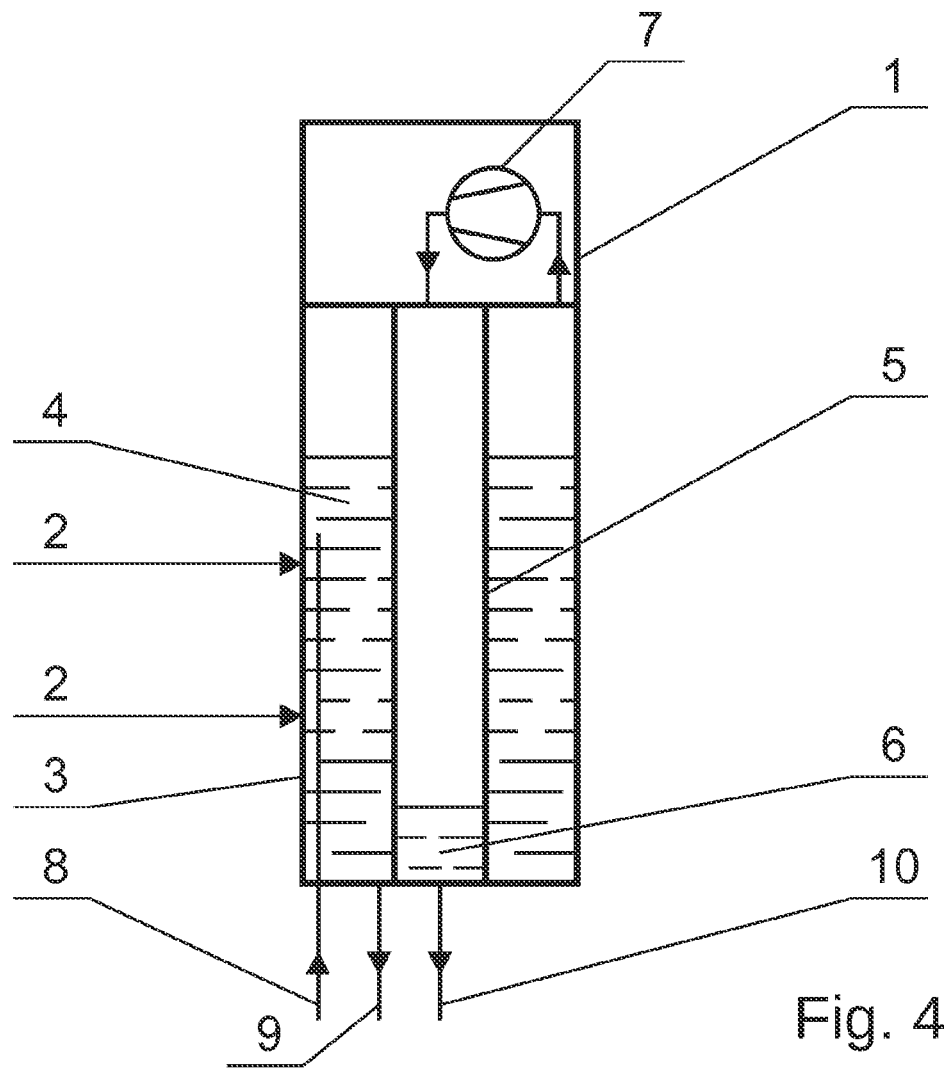
FIG. 4: Variant B of the distillation assembly 1 in which a container 3 containing the feed liquor 4 is located in a container 5 containing the distillate 6 and the vapor which is produced by the evaporation of the feed liquor 4 with the aid of the energy of sunlight 2 and is compressed by a compressor 7, and in which there is a feed line 8 and a discharge line 9 for the feed liquor 4 and a discharge line 10 for the distillate 6.
Figure 5:
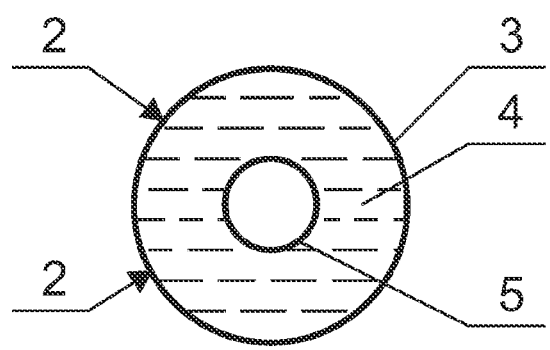
FIG. 5: Cross-section of variant B through the feed liquor 4, which is in a container 3 irradiated by sunlight 2 and the container 5 for the distillate.

In variant B of the invention (FIGS. 4 and 5), a container 5 containing the distillate 6 and the vapor is located in the container 3 containing the feed liquor 4, wherein the containers 3, 5 are in thermal contact, wherein the vapor is produced by the evaporation of the feed liquor 4 with the aid of the energy of sunlight 2 and compressed by a compressor 7 so that it condenses on the walls of the distillate container 5 and releases the inherent thermal enthalpy of vaporization and thermal energy to the feed liquor container 3 in order to return the heat to the feed liquor 4. In this case, the light from the sun 2 strikes the outer container 3 which contains the feed liquor.

Figure 6:
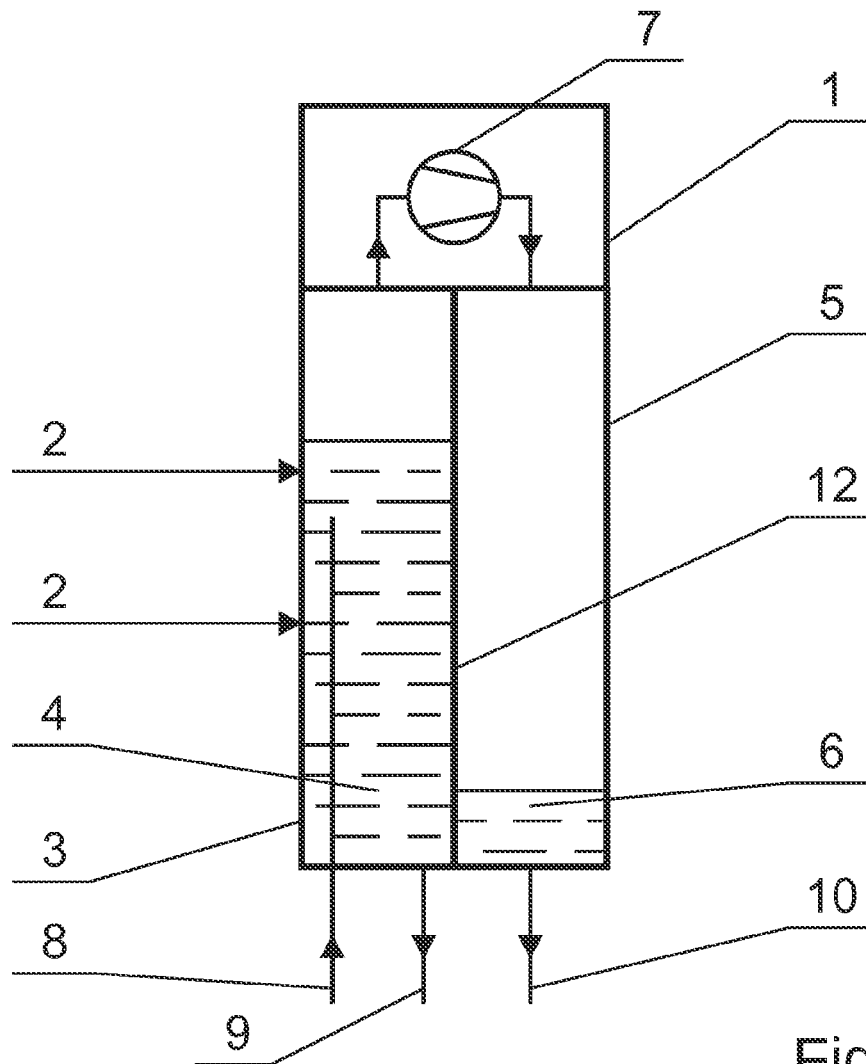
FIG. 6: Variant C of the distillation assembly 1 in which a container 3 containing the feed liquor 4 is in thermal contact via a membrane and/or contact surface 12 with a container 5 containing the distillate 6 and the vapor which is produced by the evaporation of the feed liquor 4 with the aid of the energy of sunlight 2 and is compressed by a compressor 7, and in which there is a feed line 8 and a discharge line 9 for the feed liquor 4 and a discharge line 10 for the distillate 6.
Figure 7:
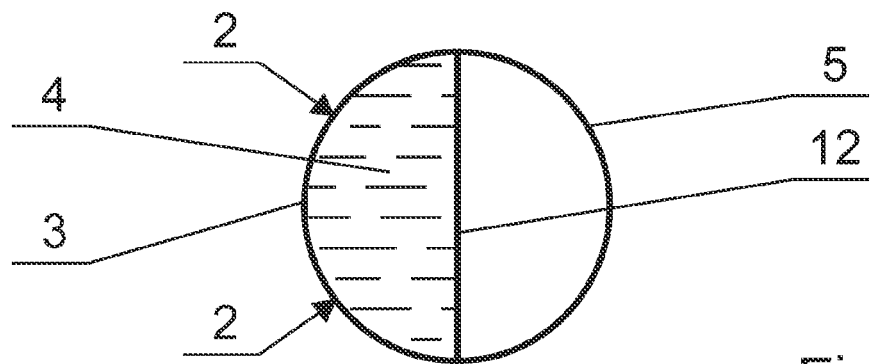
FIG. 7: Cross-section of variant C through the feed liquor 4 which is located in a container 3 irradiated by sunlight 2 and which is in thermal contact with a container 5 for the distillate via a membrane and/or contact surface 12.

In variant C of the invention (FIGS. 6 and 7), a container 3 containing the feed liquor 4 is in thermal contact, via a membrane and/or contact surface 12 with a container 5 containing the distillate 6 and the vapor, wherein the vapor is produced by the evaporation of the feed liquor 4 with the aid of the energy of sunlight 2 and compressed by a compressor 7 so that it condenses on the walls of the membrane or contact surface 12 and releases the inherent thermal enthalpy of vaporization and thermal energy to the feed liquor container 3 in order to return the heat to the feed liquor 4. In this case, the radiation from the sun 2 strikes the feed liquor container, and the distillation assembly 1 can be turned so that, if possible, only the feed liquor container is illuminated, or it can strike both types of containers 3, 5, in which case the solar energy is transferred to the feed liquor container by heat conduction.

The feed liquor 4 is continuously supplied 8 and discharged 9 in all three variants 1 and the inflow and outflow quantity is controlled so that the level of the feed liquor 4 remains within a certain range and the feed liquor retains a liquid consistency. The distillate 6 is continuously discharged 10 and the discharge quantity is regulated so that the level of the distillate is above the discharge lines 10 so that no vapor can escape. The regulator can be manual or automated (e.g. electronic and/or mechanical). Sight glasses may be provided to support the manual control, in order to make the level of the liquids 4, 6 visible. For the automated control, sensors are provided which transmit the level to the control system in order to generate a control signal for valves and pumps. In addition, one or more heat exchangers may be provided to keep the discharge fluid as hot as possible, by supplying the heat of the outflowing feed liquor 9, the distillation residue, and/or the outflowing distillate 10 of the feed liquor.

The solar energy 2 can be supplied through concentration with a parabolic trough mirror, a Fresnel mirror or a Fresnel lens, in the focal line of which the distillation assembly is located, or by a plurality of mirrors, in which case the distillation assembly is constructed as a tower, a so-called solar tower, and is surrounded by these mirrors which concentrate the solar energy onto the solar tower. However, the solar energy can also be supplied directly to the distillation assembly, in which case a vacuum pump 11 preferably generates negative pressure or the device is operated at high altitudes in order to lower the boiling temperature.

The containers of the distillation assembly may also deviate from the circular cross-section and exhibit, for example, an oval, elliptical, triangular or polygonal cross-section. The surface may be corrugated and/or bear ribs in order to improve heat transfer and increase the evaporation and condensation surface.

Figure 8:
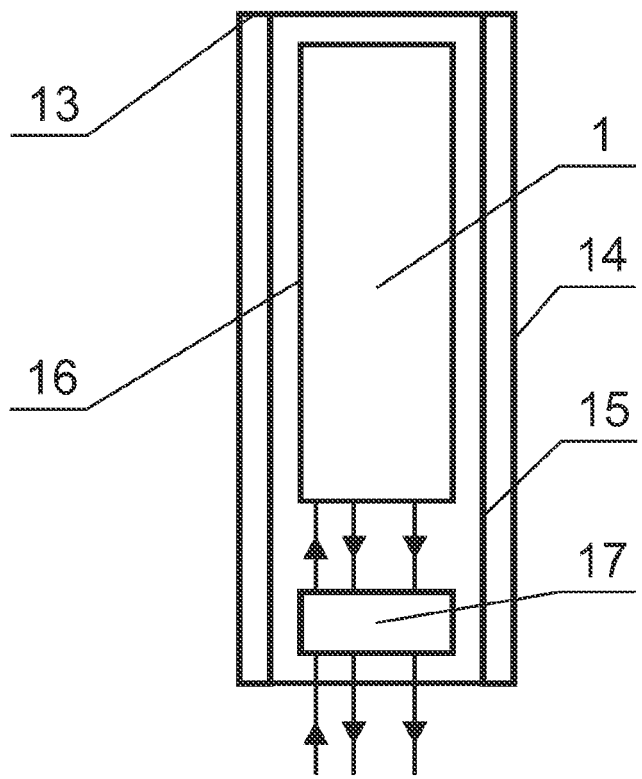
FIG. 8: The distillation assembly 1 is located in a double-walled light-transmitting evacuated tube 13 wherein the outer tube 14 and the inner tube 15 are translucent and a solar radiation absorbing layer can be found on the surface 16 or part of the surface 16 of the distillation assembly 1. A heat exchanger 17 is located inside the double-walled evacuated tube 13.
Figure 9:
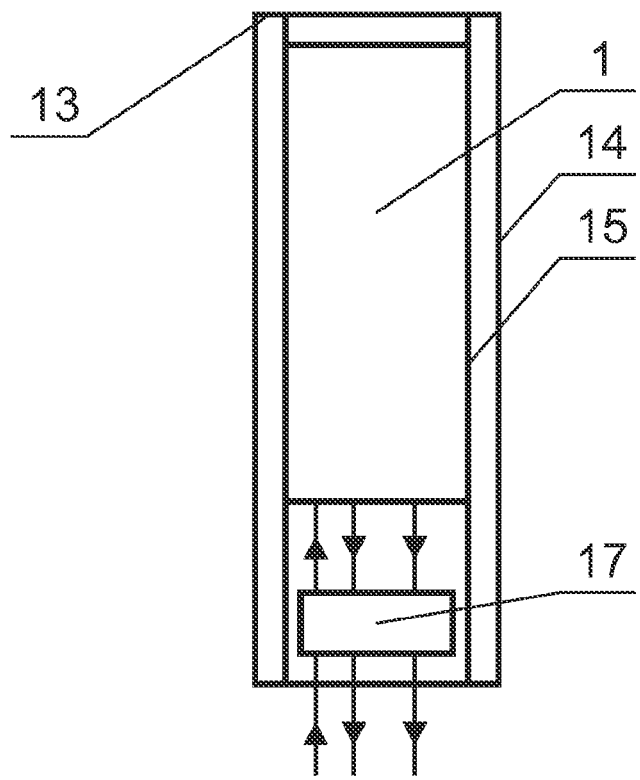
FIG. 9: The distillation assembly 1 in a double-walled evacuated tube 13, wherein the outer tube 14 is translucent and the inner tube 15 is translucent (variant A) or non-translucent (variants B and C) and serves as a container for the feed liquor and/or the distillate and carries a solar radiation absorbing (variants B and C) layer. A heat exchanger 17 is located inside the double-walled evacuated tube 13.

The invention (FIGS. 8 and 9) can be improved by surrounding the distillation assembly 1 with a double-walled tube 13 which is evacuated similar to a thermos flask and where at least the outer tube 14 is translucent. In variant A of the invention, both tubes 14, 15 must be translucent. In variant B and C of the invention, the outer tube 14 must be translucent and the inner tube can be translucent 15 or coated with a sunlight-absorbing layer (e.g. TiNox), in which case it serves as a container for the feed liquor (FIG. 9). If the inner tube 15 is translucent, the solar radiation absorbing layer is on the surface 16 or part of the surface 16 of the distillation assembly 1. The light-transmitting tubes preferably have layers that reduce the reflection of solar radiation 2 and reflect the infrared radiation of the distillation assembly. Outside the area where the solar radiation strikes, the double-walled tube can be mirrored similar to a Dewar vessel in order to achieve even better heat insulation there. If one or more heat exchangers 17 are provided, which allow the feed liquor to flow in as hot as possible, then it is essential that thermally, they are well insulated from the surroundings. Heat exchangers 17 are particularly efficient in terms of their insulation if they are located within the double-walled evacuated tube, above and/or below the containers for the feed liquor and distillate. In addition, one or more Peltier elements may also be provided in the heat exchangers in order to supply electrical current for operating the device in accordance with the invention by means of the Seebeck effect.

Corrosion-resistant metals and/or plastics are preferably used as a material for the distillation assembly. These can also be surface-treated in order to prevent distortion when boiling and/or to promote condensation. Plastics are not as thermally conductive as metals. However, if a double-walled evacuated outer tube is used, the distillation assembly is thermally insulated from the environment to a large extent, and a higher temperature gradient does not significantly reduce the efficiency. Plastics have the advantage that they are cheaper and lighter than metals.

A decisive advantage of the invention is that the distillator has a large diameter compared to other solar systems that focus the sun's rays much more on thinner tubes in which a liquid flows that dissipates the heat. The distillation assembly 1 even needs a larger diameter, because otherwise the boiling feed liquor 4 would splash out of the container 3 for the feed liquor due to the vapor that is produced. Due to the large diameter, only a smaller focus is needed compared to solar systems that use thinner pipes and carry out the distillation in a way that is spatially separated.

This means that the parabolic trough mirror does not have to have an exact parabolic shape and that inflatable, foldable, expandable or collapsible mirrors can also be used.

If a tower with many mirrors is used, flat mirrors with the approximate width of the diameter of the tower or inflatable, foldable, expandable or collapsible mirrors can also be used. Due to the comparatively large diameter of the distillation assembly, filters, e.g. activated carbon filters, microfilters, ultrafilters and/or nanofilters, can also be installed directly in the distillation assembly to remove or reduce unwanted impurities which are present in the vapor of the feed liquor.

The compressor 7 used to compress the steam can be a flow compressor, e.g. an axial, radial or diagonal turbo compressor, a positive displacement compressor, e.g. a rotary compressor, a Roots compressor or a screw compressor, a fan or a centrifugal blower. The compressor is driven by a motor, e.g. an electric motor or a Stirling motor, or by a turbo motor, e.g. an axial, radial or diagonal turbine, or by positive displacement motor, e.g. a rotary piston machine, driven by the vapor of the feed liquor. A turbine driven by the vapor of the feed liquor may also drive a generator, the electric current of which then drives the motor of the compressor and is available for further applications, e.g. mirror control, pump operation and valve control. If the compressor 7 is driven by a turbine, a generator can also be driven, which is then available for further applications, e.g. mirror control, pump operation and valve control. This can also be used as a motor, whereby the output of the turbine can be varied by a throttle valve, a waste gate or by changing the geometry. The compressor 7 and, if provided, the turbine may also be executed as multiple units and made of plastic or partly of plastic in order to save production costs. Excess electrical power can be supplied to the feed liquor via heating elements. A gearbox can also be arranged between all units to adjust speeds. If a motor is provided, the unit can also be operated with negative pressure.

Figure 10:
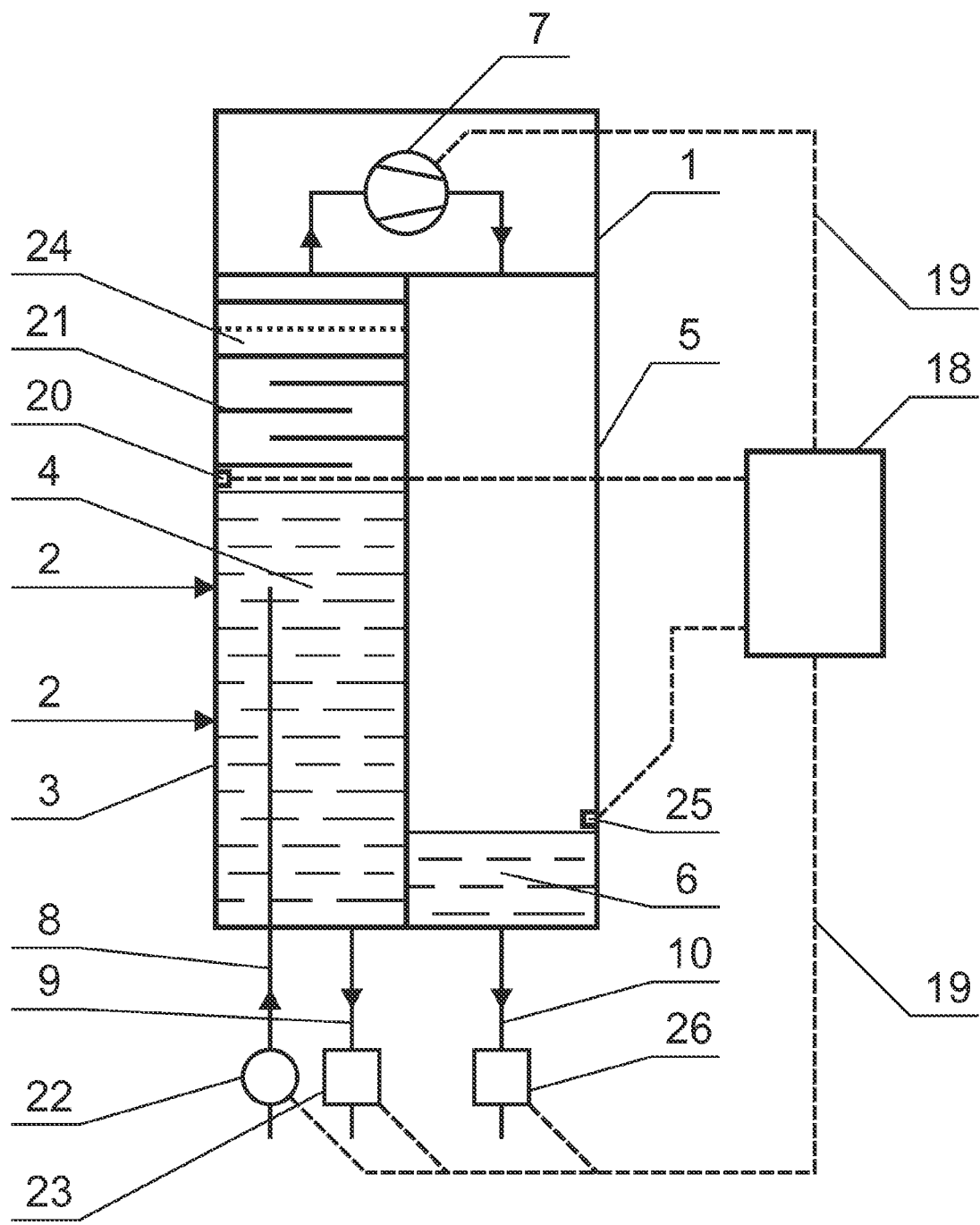
FIG. 10: The distillation assembly 1 with an electronic regulator 18 and control and/or signal lines 19 which is irradiated by sunlight 2, in which there is a container 3 which contains the feed liquor 4 which, at this point, is in thermal contact with a container 5 in which the distillate 6 collects, wherein a compressor 7 compresses the vapor produced by boiling the feed liquor 4 into the distillate container 5 and in which there is a feed line 8 and a discharge line 9 for the feed liquor and a discharge line for the distillate 10. There is level indicator 20 in the container 3 for the feed liquor 4. The droplets produced during boiling are intercepted by a splash guard 21, e.g. a labyrinth, through which the vapor flows. The electronic regulator 18 controls a pump 22 that delivers the feed liquor 4 to the container 3 and a valve 23 that controls the outflow of the feed liquor (distillation residue). A filter 24 removes or reduces unwanted impurities which are present in the vapor of the feed liquor. A level indicator 25 is provided in the container 5 for the distillate 6, and a valve 26 is controlled in the discharge line 10 in such a way that the level of the liquid distillate 6 is above the discharge line 10 so that no vapor can escape.

FIG. 10 shows the device 1 in accordance with the invention with an electronic regulator 18 and/or control or signal lines 19. In the container 3 for the feed liquor there is a level indicator 20 which prevents feed liquor from entering the compressor by means of a level regulator. When liquids are evaporated, gas bubbles are formed which are capable of splashing the liquid. The vapor flow can then transport the liquid droplets further. If necessary, these droplets are intercepted by a splash guard 21, e.g. a labyrinth, sieve and/or wire mesh, through which the vapor flows, before they enter the compressor. The level regulator controls one or more pumps 22 that deliver the output liquid 4 to the feed liquor container 3 and/or one or more valves 23 that control the outflow of the feed liquor (distillation residue). The level regulator is intended to ensure that no liquid enters the splash guard, an optional filter 24 and/or the compressor and that the distillation residue remains liquid so that it can flow out of the distillation assembly 1. There is a level indicator 25 in the container 5 for the distillate 6 which, on the one hand, prevents vapor from escaping from the compressor by means of a level regulator, and on the other hand prevents the level of the distillate from remaining as low as possible so that there is the greatest possible surface area for the condensation of the vapor. For this purpose, one or more valves 26 are controlled in the discharge line or lines so that the level of the liquid distillate is above all the discharge lines. All pumps can be replaced by a container placed above the distillation assembly from which, with the help of gravity and one or more control valves, the feed liquor is fed to the distillation assembly or several distillation assemblies. Each valve can also be replaced by a pump, e.g. a gear pump or peristaltic pump, which pumps liquids in a well-dosed manner. The measurement of the level in both containers can be done e.g. with a float, by measuring the electrical conductivity, by measuring capacity, by optical measurement, by ultrasonic measurement or by measurement with microwaves or radar. The level regulation can be mechanical and/or electronic. Pressure regulation can be performed through the power of the drive of the compressor 7. If there is a turbine to drive the compressor, the pressure control can be varied by the power of the turbine through a throttle valve, a waste gate or by changing the geometry.

If a filter 24 is installed in the turbine, it is necessary to take into account that a pressure drop will occur in the filter. Excess pressure can be discharged by one or more relief valves or reduced by swinging out the mirror.

In addition, there may be further feed and discharge lines through which cleaning, disinfection and/or rinsing liquids are fed to the distillation assembly. During distillation, scale can form in the containers and in the feed and discharge lines (scaling). Furthermore, biological contamination as a result of organisms can lead to a problem (fouling). Cleaning, disinfecting and/or rinsing can help to get both under control. The surfaces of the containers can be coated with scaling and fouling-repellent layers (e.g. Teflon®) or nano-technologically treated (e.g. carbon nanotubes). The coatings can also improve the corrosion behavior of the container materials. Furthermore, it is possible to use physical methods for cleaning, such as ultrasound and/or vibrations, by using appropriate sound generators, e.g. piezo crystals and/or vibrator devices in the distillation assembly and at the inlet and outlet pipes. For large installations, preferably solar towers, a so-called pig can be used. This is a device used in pipelines that moves through tubes or tubular containers and checks and cleans the walls. In the case of the device in accordance with the invention, its movement is carried out e.g. via ropes and/or toothed racks.

Photovoltaic cells can be found on the solar radiation absorbing layer, the electricity from which can be used to drive the compressor and/or is available for other applications, e.g. mirror control, pump operation and valve control. The advantage of this arrangement is that the efficiency of the photovoltaic cells plays an insignificant role, because the waste heat from the photovoltaic cells can be used to evaporate the feed liquor. When the solar radiation is concentrated by mirrors, the photovoltaic cells operate at high temperatures, reducing their efficiency. However, efficiency is increased due to the concentrated sunlight. As an option, photovoltaic cells may also be mounted at other locations on the device in accordance with the invention.

In all three variants, the distillation assembly 1 can be installed or erected in different ways. These designs are shown in FIGS. 11, 12, 13 and 14 and are designed as CSP (concentrated solar power) plants.

Figure 11:
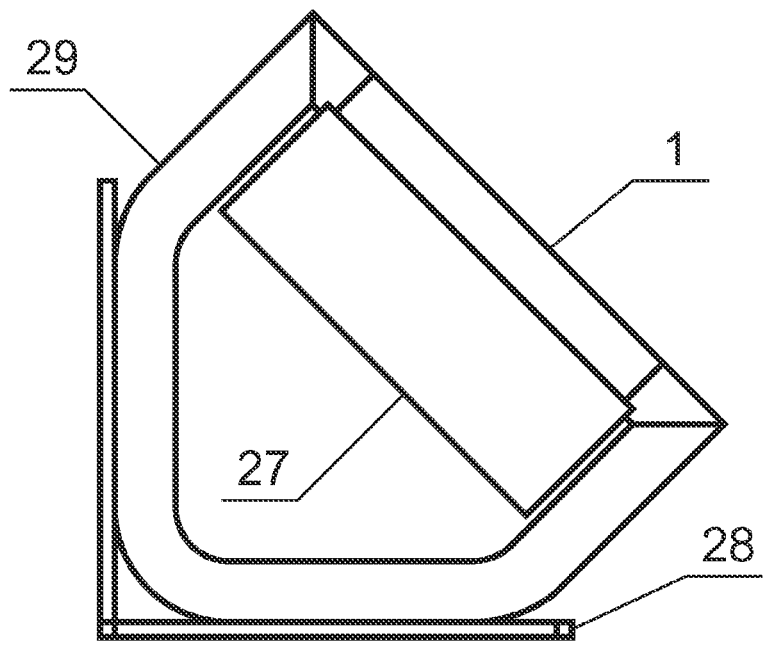
FIG. 11: The distillation assembly 1, shown from the side, is inclined and oriented substantially normal towards the solar radiation. The arrangement consisting of the distillation assembly 1 and parabolic trough mirror 27 is held in position by a frame 28, part of which is formed by a "D" shaped tube 29.
Figure 12:
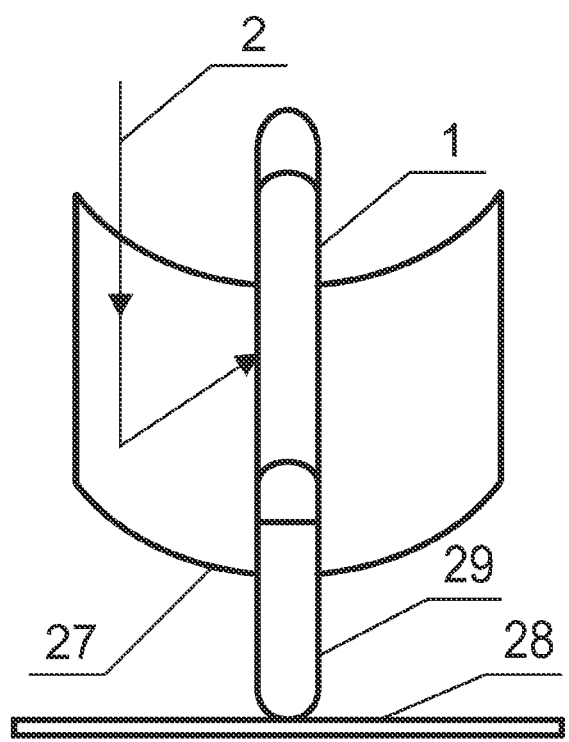
FIG. 12: The distillation assembly 1, shown from the front, is inclined and oriented substantially normal towards the solar radiation. The arrangement consisting of the distillation assembly 1 and parabolic trough mirror 27 is held in position by a frame 28, part of which is formed by a "D" shaped tube 29. The distillation assembly 1 is illuminated with solar radiation 2 via the parabolic trough mirror 27.

The distillation assembly 1 is inclined and oriented substantially normal towards the solar radiation (FIGS. 11 and 12). A parabolic trough mirror 27, in the focal line of which the distillation assembly 1 is located, is rotatably mounted. The arrangement of the distillation assembly 1 and parabolic trough mirror 27 is held in position by a frame 28, wherein part of this frame 28 is preferably formed by a tube 29 in the shape of a "D" and this tube is optionally rotated along with the parabolic trough mirror. In particular, if the compressor of the distillation assembly is driven by a turbine by the vapor of the feed liquor, this vapor can be directed into the tube 29 and condensed there so that this distillate additionally accumulates there. A condenser can be located in the tube 29 if the vapor from the turbine does not condense entirely on the tube walls. The condenser can be cooled with the feed liquor or other liquids. The distillate from the distillation assembly can optionally also be collected in the tube 29. The parabolic trough mirror 27 is automatically or manually adjusted by a drive so that the reflected and focused solar radiation 2 falls on the distillation assembly 1. Furthermore, the elevation angle of the distillation assembly 1 and the parabolic trough mirror 27 can be changed depending on the position of the sun during the day. This design is particularly suitable for dismountable and portable designs with optional manual tracking of the mirror. For this purpose, the device in accordance with the invention is constructed in a modular manner. The modular components are, for example, the distillation assembly 1, the mirror 27, the tube 29 in "D" shape and the frame 28. The mirror 27 can additionally be designed to be foldable, expandable and/or inflatable. The tube 29 can be further separated, e.g. to allow cleaning. The frame 28 and the other modules are preferably held together by screw fasteners and/or quick-release fasteners. Due to the inclined arrangement of the distillation assembly, this design is unsuitable for equatorial latitudes.

Figure 13:
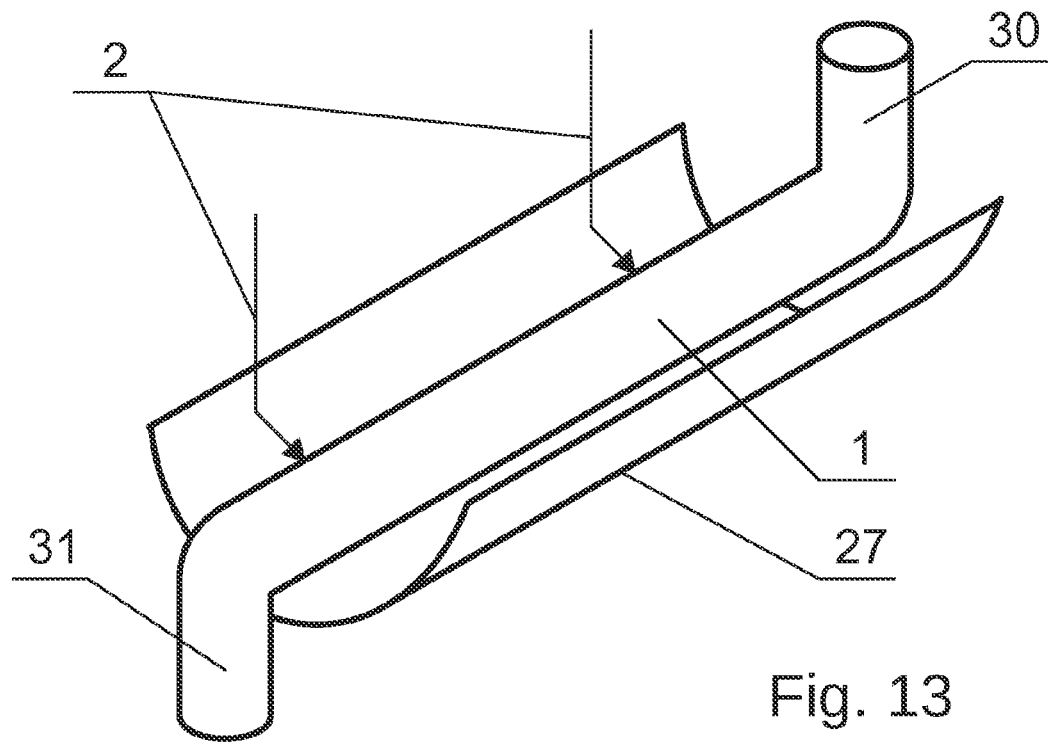
FIG. 13: A parabolic trough mirror 27, in the focal line of which the distillation assembly 1 is located, is mounted horizontally and rotatably. The distillation assembly is curved upwards at one end 30 so that the feed liquor and distillate do not flow into the compressor or turbine and curved downwards at the other end 31 so that the distillate can be tapped there.
Figure 14:
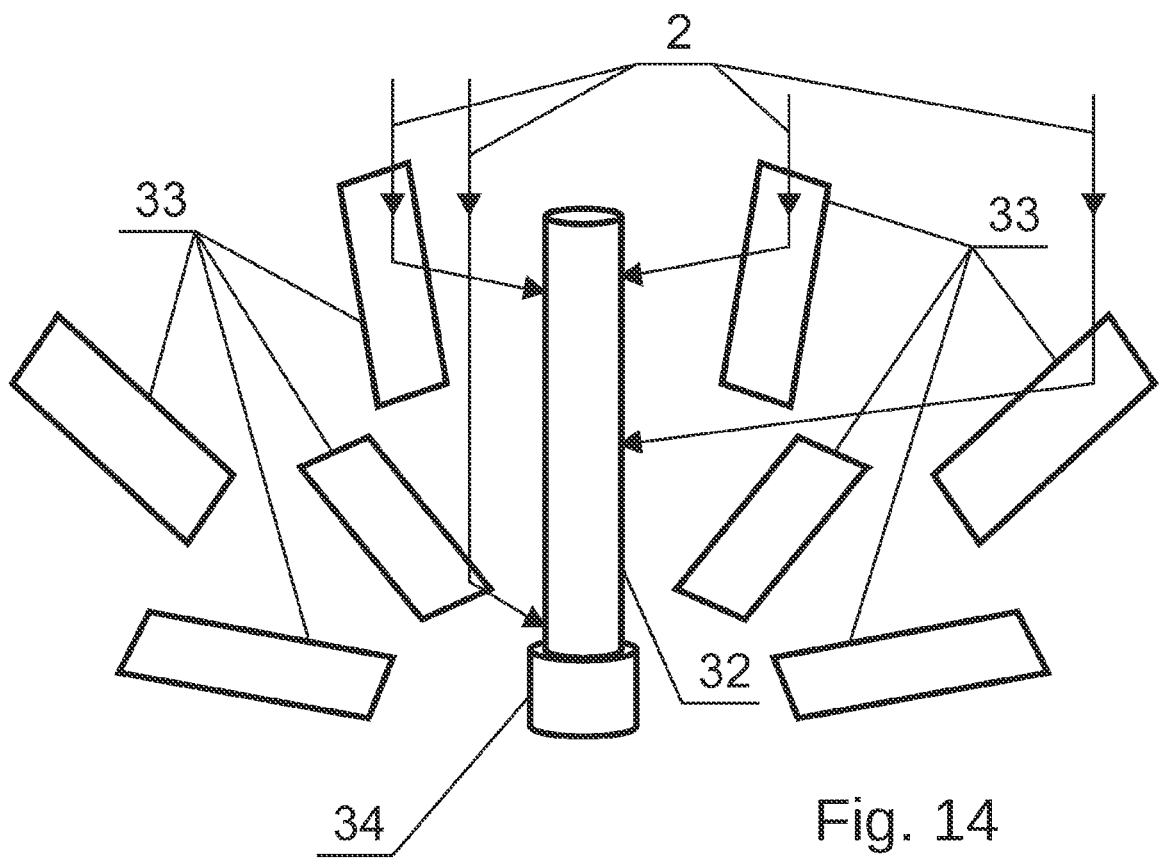
FIG. 14: The distillation assembly 1 is erected as a solar tower 32 and surrounded by mirrors 33 which direct the solar radiation 2 onto the solar tower 32. Depending on the topography of the installation site, it may be necessary to place the distillation assembly on a platform 34 so that it can be illuminated along its entire length.

The distillation assembly 1 is arranged either horizontally, sloping southwards in the northern hemisphere of the earth, or sloping northwards in the southern hemisphere of the earth, in a north-south direction (FIG. 13). A parabolic trough mirror 27, in which the center of the distillation assembly 1 and/or the container 3 for the feed liquor is located in its focal line, is rotatably mounted. The distillation assembly is curved upwards at one end 30 so that the feed liquor and the distillate do not flow into the compressor or turbine and is curved downwards at the other end 31 so that the distillate can be tapped there. The end 30 of the distillation assembly in which the compressor is located, which is in the north in the northern hemisphere and in the south in the southern hemisphere, is preferably placed in an elevated position so that the vapor in the distillation assembly can escape more easily and the solar radiation strikes the distillation assembly 1 more intensively than in a horizontal arrangement.

The tracking is carried out automatically by a drive depending on the time of day so that the reflected and focused solar radiation 2 falls on the distillation assembly 1 and/or on the container 3 for the feed liquor. This design 11 is also suitable for equatorial latitudes and is suitable for a solar farm power plant with a large number of distillation assemblies.

The distillation assembly 1 is erected as a solar tower 32 and surrounded by mirrors 33 (FIG. 14) which direct the sunlight onto the solar tower 32, wherein each mirror 33 must be aligned according to the time of day and season for this purpose. The solar radiation 2 is preferably directed as uniformly as possible through these mirrors 33 onto the tower-shaped distillation assembly. Depending on the topography of the installation site, it may be necessary to place the distillation assembly on a platform 34 so that it can be illuminated along its entire length. The mirrors 33 are preferably designed as rectangular because the tower-shaped distillation assembly preferably has an elongated shape. In contrast to other tower-shaped solar systems, the solar radiation is not directed to a point but to a line. This means that the temperatures and requirements of the materials are less and birds flying near the tower 32 are exposed to less danger.

The device in accordance with the invention is also suitable for being executed as an off-shore installation in a body of water. The device in accordance with the invention or parts of the device in accordance with the invention may be floating, in which case they are either anchored to the bottom of the body of water and/or have their own propulsion to maintain position. The device in accordance with the invention or parts of the device in accordance with invention can also be located at the bottom of the body of water and extend above the surface of the water by means of a tower and/or a foundation, in which case several or all of the parts can also be mounted on one or more platforms. If a parabolic trough mirror 27 is used, the entire device is located in the body of water, although installation in a tidal zone is also possible. When using a tower 32, the tower 32 and the mirrors 33 can be located in water and/or in a tidal area. However, the tower 32 can also be on land and all, or some of the mirrors 33 can be in the water. Conversely, the tower 32 can be in water and/or a tidal area and in addition, several or all mirrors 33 can be on land.

The invention will be explained in more detail using specific examples.

Figure 15:
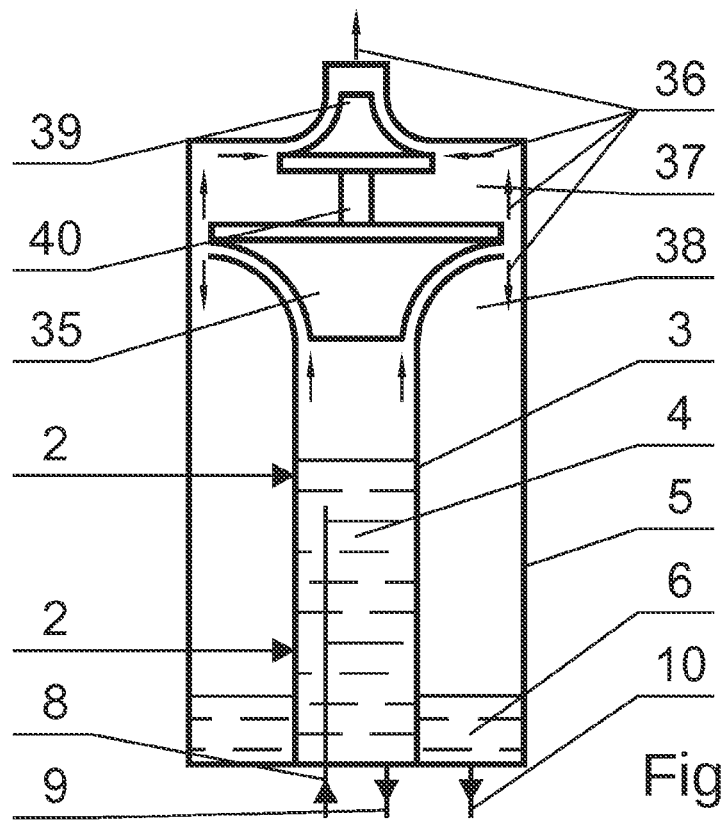
FIG. 15: Variant A of the distillation assembly 1 as a cross-section along the central axis, in which a container 3 containing the feed liquor 4 is located in a container 5 containing the distillate 6 and the vapor produced by the evaporation of the feed liquor 4 with the aid of the energy of sunlight 2 with a radial compressor turbine 35, wherein the vapor 36 (small arrows) is compressed from the inside to the outside and directed to the area above 37 and below 38 the compressor. Above the compressor 35 there is a radial turbine 39 which is driven by the vapor 36 (small arrows) and drives the compressor 35 via an axle 40, wherein the vapor 36 (small arrows) flows from the outside to the inside. A feed line 8 and a discharge line 9 are provided for the feed liquor 4 as well as a discharge line 10 for the distillate 6.

FIG. 15 shows variant A as a cross-section along the central axis with a radial compressor turbine 35, wherein the vapor 36 (small arrows) is compressed from the inside to the outside (outflow) and fed into the area above 37 and below 38 the compressor. Above the compressor 35 there is a radial turbine 39 which is driven by the vapor 36 (small arrows) and which drives the compressor 35 via an axle 40, wherein the vapor 36 (small arrows) flows from the outside to the inside (inflow). It is also possible to only direct the compressed vapor into the area below 38 the compressor and to drive the turbine 39 directly with the vapor from the container 5 of the feed liquor, wherein, for example, the axle 40 is made from hollow material so that this vapor can reach the area above 37 the compressor in order to drive the turbine 39. However, the vapor can also be directed sideways past the compressor via pipe connections. The compressed vapor condenses on the outer surface of the inner container 3. The arrangement is, for the most part, rotationally symmetrical, with the exception of the feed and discharge lines for the liquids. The feed liquor is fed into the central container by a pump and discharged via a valve. The distillate collects in the outer container and is discharged via a valve.

Figure 16:
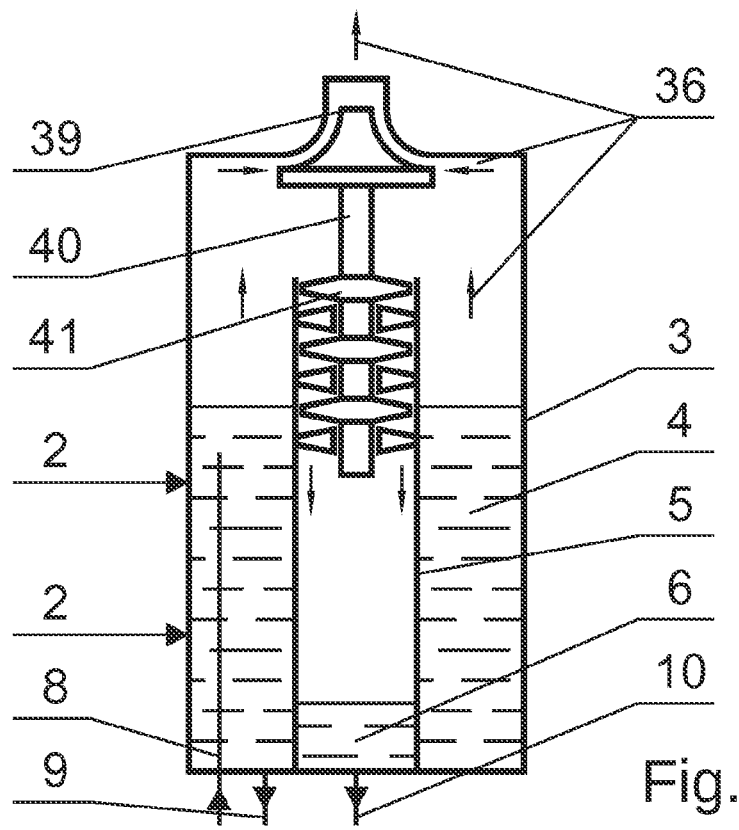
FIG. 16: Variant B of the distillation assembly 1 as a cross-section along the central axis, in which a container 5 containing the distillate 6 and the vapor produced by the evaporation of the feed liquor 4 with the aid of the energy of sunlight 2 is located in the container 3, with an axial compressor turbine 41. Above the compressor 41 there is a radial turbine 39 which is driven by vapor 36 (small arrows) and drives the compressor 41 via an axle 40, wherein the steam 36 (small arrows) flows from the outside to the inside. A feed line 8 and a discharge line 9 are provided for the feed liquor 4 and a discharge line 10 for the distillate 6.

FIG. 16 shows variant B as a cross-section along the central axis with an axial compressor turbine 41. Above the compressor 41, there is a radial turbine 39 which is driven by the vapor 36 (small arrows) and which drives the compressor 41 via an axle 40, wherein the vapor 36 (small arrows) flows from the outside to the inside (inflow). The compressed vapor condenses on the inner surface of the inner container 5. The arrangement is largely rotationally symmetrical, except for the feed and discharge lines of the liquids. The feed liquor is fed into the outer container by a pump and discharged via a valve. The distillate collects in the middle container and is discharged via a valve.

Figure 17:
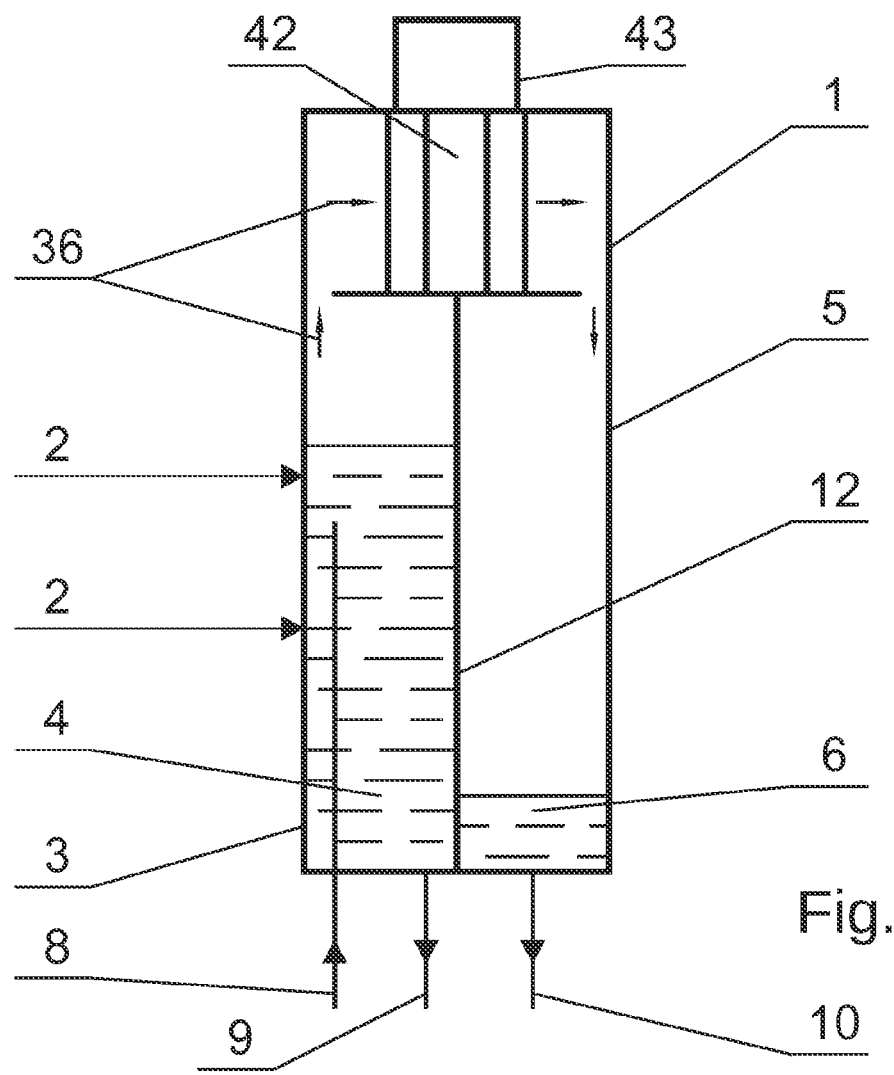
FIG. 17: Variant C of the distillation assembly 1 as a cross-section along the central axis, in which a container 3 containing the feed liquor 4 is in thermal contact via a membrane and/or contact surface 12 with a container 5 containing the distillate 6 and the vapor produced by the evaporation of the feed liquor 4 with the aid of the energy of sunlight 2 with a Roots compressor 42. The Roots compressor 42 is driven by an electric motor 43 and compresses the vapor 36 (small arrows) from the left tank 3 into the right tank 5. A feed line 8 and a discharge line 9 are provided for the feed liquor 4 and a discharge line 10 for the distillate 6.
Figure 18:
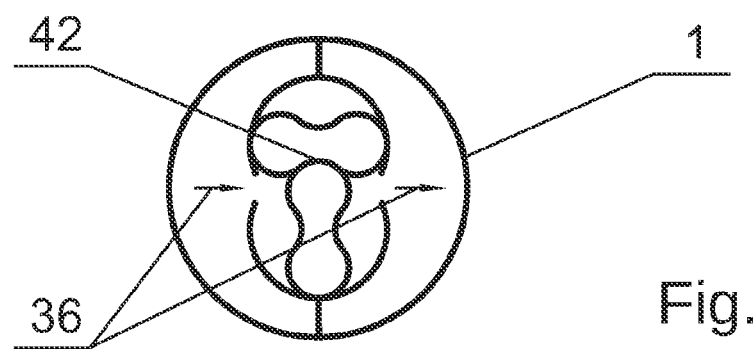
FIG. 18: Variant C of the distillation assembly 1 as a cross-section through the Roots compressor 42 normal to the central axis. The Roots compressor 42 compresses the vapor 36 (small arrows).

FIG. 17 shows variant C as a cross-section along the central axis with a Roots compressor 42. FIG. 18 shows this variant in as cross-section through the Roots compressor 42 normal to the central axis. The Roots compressor 42, which is driven by an electric motor 43, compresses the vapor 36 (small arrows) from the left-hand container, which contains the feed liquor, into the right-hand container. The compressed vapor condenses on the separating surface 12 of the two containers. The feed liquor is fed into the left-hand container by a pump and discharged via a valve. The distillate collects in the right container and is discharged via a valve.

All designs of the distillation assembly 1 shown in FIGS. 15, 16, 17 and 18 can be irradiated directly by a parabolic trough mirror, in the focal line of which the distillator is located, or by sunlight through a plurality of mirrors, in which case the distillation assembly is erected as a solar tower 32 and surrounded by these mirrors 33.

The tracking of the mirror(s) can be computer-controlled, because the position of the sun is well-defined at any time at any place on earth. Alternatively it can be carried out by photocells which, for example, find the brightest point in the sky, by forming shadows. In the event of hail or other severe weather, the mirror can be controlled to act as a shield for the distillation assembly. Using the invention, it is possible to erect large installations, e.g. by using the design with a horizontal distillation assembly arranged in multiple rows or by making the tower design correspondingly large and constructed with many mirrors. If necessary, multiple distillation assemblies are also possible with the invention, e.g. for the production of bioethanol, by arranging distillators one behind the other and using the respective distillation residue as the feed liquor for the next distillation assembly. In the case of seawater desalination, it is possible to conduct the resulting distillation residue, the brine, into evaporation basins in order to obtain salt.

Finally, an explanation is given as to how boiling delay can be reduced and/or prevented.

Boiling distortion often occurs in distillation processes. In order to prevent scale and biological deposits which promote boiling delay, smooth surfaces are required in the container 3 of the feed liquor 4, especially in the case of salt water desalination. Boiling distortion is particularly unfavorable in tubular containers, because the sudden uncontrolled boiling can cause the feed liquor 4 to splash and contaminate the system and/or the distillate. One way to avoid this is to use boiling stones and/or one or more boiling rods placed in the feed liquor container 3. Furthermore, agitators that stir the feed liquor 4 have proven their worth. Boiling distortion can also be prevented by introducing air, gas or vapor into the feed liquor 4 and/or by optionally fusing quartz grit on the top or partial top surface of the container 3 for the feed liquor 4 made from quartz glass.

Another method is to expose the feed liquor container 3 to ultrasound, which not only prevents boiling distortion but also counteracts scale and biological deposits. In addition, the distillate can be physically treated in order to treat the germs, e.g. by means of radiation sterilization with UV light, using mercury vapor lamps, light-emitting diodes, lasers and/or gas discharge lamps, preferably arranged in the distillate container. As an option, pressure and temperature sensors are installed in the device according to the invention, the measurement signal of which is preferably transmitted onwards to the electronic regulator 18 in order to be able to control the boiling of the feed liquor 4 more accurately.

The invention claimed is:

1. A distillation assembly (1) which, with the aid of solar energy (2), continuously evaporates a feed liquor (4), comprising:
    at least one feed container (3) containing the feed liquor (4) and at least one distillate container (5) for collecting a distillate, wherein the at least one feed container (3) and the at least one distillate container (5) are in thermal contact with each other, wherein the at least one feed container (3) and the at least one distillate container (5) each have a cross-section selected from the group consisting of circular, oval, elliptical, triangular, and polygonal, and wherein the at least one feed container (3) and the at least one distillate container (5) each have a surface allowing for heat transfer, evaporation, and condensation of the feed liquor (4);
    at least one compressor (7) for compressing a vapor, the vapor being produced as a result of boiling the feed liquor (4) by concentrating solar energy (2) and by negative pressure, into the at least one distillate container (5), wherein the vapor condenses in the at least one distillate container (5) and wherein vaporization enthalpy and thermal energy are returned to the feed liquor (4) via the thermal contact;
    at least one feed line (8) for feeding the feed liquor and at least one discharge line (9) for discharging the feed liquor (4);
    at least one discharge line (10) for discharging the distillate (6);
    valves (23, 26) and/or pumps (22) for controlling the feed and discharge of the feed liquor and the distillate; and
    a splash guard (21), selected from the group consisting of a labyrinth, a sieve, and a wire mesh, and at least one filter (24), selected from the group consisting of an activated carbon filter, a microfilter, an ultrafilter, and a nanofilter, are installed in the at least one feed container (3) of the feed liquor (4) which remove or reduce undesirable impurities which are present in the vapor of the feed liquor,
    wherein at least one part of the distillation assembly (1) is made of corrosion-resistant metals and/or plastics,
    wherein the at least one part is coated with polytetrafluoroethylene, or is nanotechnologically treated with carbon nanotubes, in order to prevent or reduce scale and/or biological contamination by organisms, and/or the at least one part is surface-treated and/or coated in order to prevent boiling distortion and/or to promote condensation.

2. The distillation assembly in accordance with claim 1, wherein
    the at least one feed container containing the feed liquor (4) is located in the at least one distillate container (5) containing the distillate (6) and the vapor,
    the vapor is produced by the evaporation of the feed liquor (4) with the aid of the solar energy (2) and the vapor is compressed by the at least one compressor (7) so that the vapor condenses on walls of the at least one distillate container (5) and releases thermal enthalpy of vaporization and thermal energy to the at least one feed container (3) thereby returning heat to the feed liquor (4), and
    the solar energy (2) penetrates an outer side of the at least one distillate container (5) which contain the compressed vapor, and the at least one distillate container (5) having walls that are transparent to solar radiation.

3. The distillation assembly in accordance with claim 1, wherein
    the at least one distillate container (5) containing the distillate (6) and the vapor is located in the at least one feed container (3) containing the feed liquor (4),
    the vapor is produced by the evaporation of the feed liquor (4) with the aid of the solar energy (2) and compressed by the at least one compressor (7) so that the vapor condenses on walls of the at least one distillate container (5) and releases thermal enthalpy of vaporization and thermal energy to the at least one feed container (3) thereby returning heat to the feed liquor (4), and
    the solar energy (2) strikes an outer side of the at least one feed container which contain the feed liquor.

4. The distillation assembly in accordance with claim 1, wherein
    the at least one feed container (3) containing the feed liquor (4) is in thermal contact, via at least one membrane or contact surface (12) with the at least one distillate container (5) containing the distillate (6) and the vapor,
    the vapor is produced by the evaporation of the feed liquor (4) with the aid of the solar energy (2) and compressed by the at least one compressor (7) so that the vapor condenses on walls of the at least one membrane or contact surface (12) and releases thermal enthalpy of vaporization and thermal energy to the at least one feed container (3) thereby returning heat to the feed liquor (4), and
    the solar energy (2) strikes the at least one feed container, and the distillation assembly (1) is turnable so that only the at least one feed container is illuminated by the solar energy (2), or the solar energy (2) strikes both of the containers (3, 5), in which case the solar energy (2) is transferred to the at least one feed container (3) by heat conduction.

5. The distillation assembly in accordance with claim 1, wherein
    the solar energy (2) is transmitted by means of at least one mirror (33) having a Fresnel lens, the at least one mirror (33) being selected from the group consisting of parabolic trough mirrors (27) and Fresnel mirrors, and
    the at least one mirror (33) and lens are trackable according to illumination conditions, wherein the tracking of the at least one mirror and lens is computer-controlled based on either the position of the sun or by photocells which find the brightest area in the sky, and the at least one mirror (33) and lens are rotatable into a different position in the event of storms, and
    at least parts of the distillation assembly (1) are at least one of (i) arranged as floating parts on a body of water, wherein the floating parts are either anchored to the bottom of the body of water and/or have a drive for maintaining the floating parts at a position on the body of water, (ii) stand on the bottom of the body of water or a tidal area, and (iii) held above the surface of the body of water with a tower or a foundation.

6. The distillation assembly in accordance with claim 1, wherein
   a quantity of the feed liquor (4) is supplied through the at least one feed line (8) and a quantity of the feed liquor (4) is discharged through the at least one discharge line (9) and the supply and discharge quantities are controlled whereby the level of the feed liquor (4) remains within a certain range so that no liquid enters the splash guard (21), the at least one filter (24), and/or the at least one compressor (7),
   the feed liquor (4) maintains a liquid consistency,
   the distillate (6) is continuously discharged (10),
   the discharge quantity of the distillate (6) is controlled whereby that the level of the distillate (6) is above the at least one discharge line (10) so that none of the vapor can escape, and remains as low as possible so that there is the greatest possible surface area for the condensation of the vapor, and
   regulation of the flow quantity of the feed liquor (4) and the distillate (6) that are supplied and discharged, respectively, is carried out manually or automatically, using electronic and/or mechanical means comprising sensors (20, 25) which sense and transmit the level of the feed liquor (4) and the distillate (6) to a level regulator (18) in order to generate a control signal for the valves (23, 26) and/or pumps (22) and/or sight glasses which make the level or levels of the feed liquor (4) and the distillate (6) visible.

7. The distillation assembly according to claim 1, wherein
   the at least one compressor or serving to compress the vapor is selected from the group consisting of a flow compressor, an axial turbo compressor, a radial turbo compressor, a diagonal turbo compressor, a displacement compressor, a rotary compressor, a Roots compressor, a screw compressor, a fan, and a centrifugal blower,
   the at least one compressor (7) is driven by a motor, selected from the group consisting of an electric motor (43), a Stirling motor, a turbo motor driven by the vapor of the distillate (6), a turbo motor driven by the vapor of the feed liquor (4), a rotary piston motor, and a displacement motor,
   wherein if the at least one compressor (7) is/are driven by a turbo motor or a displacement motor, the vapor of the feed liquor (4) required for this purpose is supplied to the turbo motor or to the displacement motor by pipes and/or by a hollow drive axle (40), wherein the power of the turbo motor or the displacement motor is varied by a throttle valve, a waste gate, or a change in geometry, and the vapor of the feed liquor (4) is condensed in order to obtain additional distillate, and the turbo motor or the displacement motor each drive an electric generator in order to be independent of the public power grid, and the electric generator also is used as a motor.

8. The distillation assembly in accordance with claim 1, further comprising:
   at least one heat exchanger (17) installed in the at least one feed line (8), the at least one discharge line (9) for discharging the feed liquor (4), and the at least one discharge line (10) for discharging the distillate (6), which allow the feed liquor (4) to flow in hot by supplying the heat of outflowing distillation residue of the feed liquor (4) in the at least one discharge line (9) for discharging the feed liquor (4) and/or outflowing of the distillate (6) in the at least one discharge line (10) for discharging the distillate (6) to the at least one feed line (8), and
   a double-walled evacuated tube (13) in which the at least one heat exchanger (17) is located so that the thermal insulation is improved.

9. The distillation assembly according to claim 1, further comprising a parabolic trough mirror (27) having a focal line, the parabolic trough mirror (27) being rotatably mounted or mounted on a rotatable tube (29), wherein
   the distillation assembly (1) is inclined and oriented substantially normal to the solar energy (2) and in the focal line of the parabolic trough mirror (27),
   the distillation assembly (1) and the parabolic trough mirror (27) are held in position by a frame (28), a part of this frame (28) formed by the tube (29) in a "D" shape and the parabolic trough mirror,
   if the at least one compressor (7) of the distillation assembly with at least one turbine are operated by the vapor of the feed liquor (4), this vapor is conducted into the tube (29) and condenses there, whereby the distillate (6) thereby produced accumulates in the tube (29),
   an angle of elevation of the distillation assembly (1) and of the parabolic trough mirror (27) is changed depending on the position of the sun in the course of the day with the aid of a rotatable bearing and a drive,
   the distillation assembly (1) is constructed in a modular manner.

10. The distillation assembly according to claim 9, wherein
    the distillation assembly (1) has an axial configuration and is arranged with the axial configuration either horizontal or slightly in a sloping direction, substantially in a north-south direction, and the distillation assembly (1) or the feed container (3) for the feed liquor (4) is centrally located in the focal line of the parabolic trough mirror (27),
    the distillation assembly (1) is bent upwards at one end (30) so that the feed liquor (4) and the distillate (6) do not flow into the at least one compressor (7) and/or into the at least one turbine, respectively, and is bent downwards at another end (31) for discharge of the distillate (6),
    the one end (30) of the distillation assembly (1) in which the at least one compressor (7) is located is arranged in a slightly elevated fashion so that the vapor in the distillation assembly (1) can escape more easily,
    tracking of the distillation assembly (1) relative to the sun is carried out automatically depending on the time of day whereby reflected and focused solar energy (2) is directed onto the distillation assembly (1) or onto the at least one feed container (3).

11. The distillation assembly according to claim 1, wherein
    the distillation assembly (1) is erected vertically as a solar tower (32) and is surrounded by mirrors (33) which direct the solar energy (2) onto the solar tower (32), wherein each of the mirrors (33) is rectangular, being aligned for directing the solar energy (2) onto the solar tower (32) according to the time of day and the season, or with respect to the brightest point in the sky so that the solar energy (2) is directed onto the solar tower (32) or onto the at least one feed container (3) and is distributed there in a uniform manner, and the solar tower (32) stands on a platform (34) whereby the solar tower (32) can be illuminated over an entire length of the solar tower (32).

12. The distillation assembly according to claim 1, further comprising
    boiling stones and/or at least one boiling rod is placed in the at least one feed container (3),
    at least one agitator for stirring the feed liquor (4), and pressure and temperature sensors,
    wherein air, gas, and/or steam is/are fed into the feed liquor (4),
    wherein the at least one feed container (3) is made of quartz glass, has a top surface, and on which at least a portion of the top surface of which quartz grit is fused,
    wherein the at least one feed container (3) is exposed to ultrasound in order to prevent boiling distortion, wherein the ultrasound is also able to counteract scale and biological deposits,
    wherein the distillate (6) is physically treated to kill germs, through the use of a sterilization technique selected from the group consisting of radiation sterilization with UV light, mercury vapor lamps, light-emitting diodes, lasers, and/or gas discharge lamps, which are arranged in the distillate container (5), and
    wherein measurement signals of the pressure and temperature sensors are passed on to an electronic regulator (18) for controlling the boiling of the feed liquor (4) more accurately.

13. The distillation assembly according to claim 1, wherein the surface of the at least one feed container (3) and the surface of the at least one distillate container (5) is corrugated and/or comprises ribs in order to improve the heat transfer and to increase the evaporation and condensation of the surface.

14. The distillation assembly according to claim 1, further comprising at least one vacuum pump (11) which generates negative pressure in the at least one feed container (3) which contains the feed liquor (4).

15. The distillation assembly according to claim 1, wherein the distillation assembly (1) is operated at a higher altitude so as to lower the boiling temperature of the feed liquor (4).

16. The distillation assembly according to claim 5, wherein the at least one mirror (33) is selected from the group consisting of inflatable, foldable, expandable, and collapsible mirrors.

17. A distillation assembly (1) which, with the aid of solar energy (2), continuously evaporates a feed liquor (4), comprising:
    at least one feed container (3) containing the feed liquor (4) and at least one distillate container (5) for collecting a distillate, wherein the at least one feed container (3) and the at least one distillate container (5) are in thermal contact with each other, wherein the at least one feed container (3) and the at least one distillate container (5) each have a cross-section selected from the group consisting of circular, oval, elliptical, triangular, and polygonal, and wherein the at least one feed container (3) and the at least one distillate container (5) each have a surface allowing for heat transfer, evaporation, and condensation of the feed liquor (4);
    at least one compressor (7) for compressing a vapor, the vapor being produced as a result of boiling the feed liquor (4) by concentrating solar energy (2) and by negative pressure, into the at least one distillate container (5), wherein the vapor condenses in the at least one distillate container (5) and wherein vaporization enthalpy and thermal energy are returned to the feed liquor (4) via the thermal contact;
    at least one feed line (8) for feeding the feed liquor and at least one discharge line (9) for discharging the feed liquor (4);
    at least one discharge line (10) for discharging the distillate (6); and
    valves (23, 26) and/or pumps (22) for controlling the feed and discharge of the feed liquor,
    wherein the distillation assembly (1) is located in a double-walled evacuated tube (13),
    wherein the double-walled evacuated tube (13) comprises a translucent outer tube (14) and a translucent inner tube (15),
    wherein the double-walled evacuated tube (13) either is a container (5) for the distillate (6) or the double-walled evacuated tube (13) is light absorbing by being coated with a solar radiation absorbing layer and serves as a feed container (3) for the feed liquor (4),
    wherein said translucent tubes (14, 15) have layers which reduce reflection of the solar energy (2) and reflect infrared radiation of the distillation assembly, and
    wherein, outside an area which is struck by the solar energy (2), the double-walled evacuated tube (13) is mirrored to provide additional thermal insulation.

18. A distillation assembly (1) which, with the aid of solar energy (2), continuously evaporates a feed liquor (4), comprising:
    at least one feed container (3) containing the feed liquor (4) and at least one distillate container (5) for collecting a distillate, wherein the at least one feed container (3) and the at least one distillate container (5) are in thermal contact with each other, wherein the at least one feed container (3) and the at least one distillate container (5) each have a cross-section selected from the group consisting of circular, oval, elliptical, triangular, and polygonal, and wherein the at least one feed container (3) and the at least one distillate container (5) each have a surface allowing for heat transfer, evaporation, and condensation of the feed liquor (4);
    at least one compressor (7) for compressing a vapor, the vapor being produced as a result of boiling the feed liquor (4) by concentrating solar energy (2) and by negative pressure, into the at least one distillate container (5), wherein the vapor condenses in the at least one distillate container (5) and wherein vaporization enthalpy and thermal energy are returned to the feed liquor (4) via the thermal contact;
    at least one feed line (8) for feeding the feed liquor and at least one discharge line (9) for discharging the feed liquor (4);
    at least one discharge line (10) for discharging the distillate (6);
    valves (23, 26) and/or pumps (22) for controlling the feed and discharge of the feed liquor and the distillate;
    additional feed and discharge lines through which cleaning, disinfecting, and/or rinsing liquids are fed to the distillation assembly (1);
    physical devices for cleaning the distillation assembly (1), selected from the group consisting of ultrasound and vibration devices;
    sound generators selected from the group consisting of piezo crystals and vibrator devices are installed in the distillation assembly (1) and at the at least one feed line (8) for feeding the feed liquor (4), the at least one discharge line (9) for discharging the feed liquor (4), and the at least one discharge line (10) for discharging the distillate (6);

at least one pig for checking and cleaning interior walls of tubular components of the distillation assembly (1); and a splash guard (21), selected from the group consisting of a labyrinth, a sieve, and a wire mesh, and at least one filter (24), selected from the group consisting of an activated carbon filter, a microfilter, an ultrafilter, and a nanofilter, are installed in the at least one feed container (3) of the feed liquor (4) which remove or reduce undesirable impurities which are present in the vapor of the feed liquor, wherein at least one part of the distillation assembly (1) is made of corrosion-resistant metals and/or plastics, wherein the at least one part is coated with polytetrafluoroethylene, or is nanotechnologically treated with carbon nanotubes, in order to prevent or reduce scale and/or biological contamination by organisms, and/or the at least one part is surface-treated and/or coated in order to prevent boiling distortion and/or to promote condensation.

\* \* \* \* \*